(12) United States Patent
Sun et al.

(10) Patent No.: US 10,509,450 B1
(45) Date of Patent: Dec. 17, 2019

(54) THERMALLY PROTECTING AN ACCESS POINT DEVICE

(71) Applicant: HEWLETT PACKARD ENTERPRISE DEVELOPMENT LP, Houston, TX (US)

(72) Inventors: Yue Sun, Beijing (CN); Yinzhi Dong, Beijing (CN); Lin Li, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/424,995

(22) Filed: May 29, 2019

(51) Int. Cl.
  *G06F 1/20* (2006.01)
  *G08B 21/18* (2006.01)
  *H04W 88/08* (2009.01)

(52) U.S. Cl.
  CPC ........... *G06F 1/206* (2013.01); *G08B 21/182* (2013.01); *H04W 88/08* (2013.01)

(58) Field of Classification Search
  CPC .......... H04W 52/0258; H04W 52/0261; G06F 1/266
  See application file for complete search history.

(56) References Cited

U.S. PATENT DOCUMENTS

| | | | |
|---|---|---|---|
| 6,094,567 A | 7/2000 | Berglund | |
| 7,603,710 B2 | 10/2009 | Harvey et al. | |
| 7,747,272 B2 | 6/2010 | Parsa | |
| 8,311,764 B1 | 11/2012 | Robillard et al. | |
| 10,178,578 B1 * | 1/2019 | McFarland | ........... H04W 24/10 |
| 2015/0276509 A1 | 10/2015 | Carbone et al. | |
| 2019/0171259 A1 * | 6/2019 | McFarland | ............. G06F 1/206 |
| 2019/0174336 A1 * | 6/2019 | McFarland | ........... H04W 24/04 |

FOREIGN PATENT DOCUMENTS

KR    20010047417    6/2001

OTHER PUBLICATIONS

Cisco Wireless Control System Configuration Guide, Release 7.0. 172.0, (Research Paper), Retrieved Dec. 13, 2018, 134 Pgs.

\* cited by examiner

*Primary Examiner* — Diane D Mizrahi
(74) *Attorney, Agent, or Firm* — Nolte Intellectual Property Law Group

(57) ABSTRACT

A method for thermally protecting an access point (AP) device may include receiving an actual AP power consumption value, the actual AP power consumption value being one of a plurality of potential AP power consumption values, receiving a sensed internal AP temperature value, the sensed internal AP temperature value being one of a plurality of potential internal AP temperature values, accessing an ambient temperature look up table defining relationships between the plurality of potential AP power consumption values, the plurality of potential internal AP temperature values and a plurality of ambient temperature values, and retrieving one of the plurality of ambient temperature values associated with the actual AP power consumption value and the sensed internal AP temperature value from the ambient temperature look up table, the retrieved ambient temperature value being an estimated ambient temperature value of the AP device.

20 Claims, 5 Drawing Sheets

| Potential AP Power Consumption Values (Watts) | Potential Internal AP Temperature Values (Celsius) | Ambient Temperature Values (Celsius) | Temperature Dissipation Values (Celsius) |
|---|---|---|---|
| 12.0 | 85 | 55 | 30 |
| | 67 | 35 | 32 |
| | 50 | 15 | 35 |
| 18.0 | 91 | 55 | 36 |
| | 73 | 35 | 38 |
| | 55 | 15 | 40 |
| 24.0 | 95 | 55 | 40 |
| | 77 | 35 | 42 |
| | 60 | 15 | 45 |

Ambient Temperature Look Up Table

Ambient Temperature Look Up Table — 212

| Potential AP Power Consumption Values (Watts) | Potential Internal AP Temperature Values (Celsius) | Ambient Temperature Values (Celsius) | Temperature Dissipation Values (Celsius) |
|---|---|---|---|
| 12.0 | 85 | 55 | 30 |
| | 67 | 35 | 32 |
| | 50 | 15 | 35 |
| 18.0 | 91 | 55 | 36 |
| | 73 | 35 | 38 |
| | 55 | 15 | 40 |
| 24.0 | 95 | 55 | 40 |
| | 77 | 35 | 42 |
| | 60 | 15 | 45 |

FIG. 3

THERMALLY PROTECTING AN ACCESS POINT DEVICE

BACKGROUND

Access point devices enable client devices to wirelessly join networks. A client device may be, for example, a desktop computer, a notebook computer, a tablet computer or other type of device with an ability to connect to a network wirelessly.

Operating access point devices under relatively high thermal conditions can result in damage to one or more components of the access point device. Ambient temperature contributes to the thermal operating environment of access point devices.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 3 is an example of an ambient temperature look up table.

DETAILED DESCRIPTION

Figure 1:
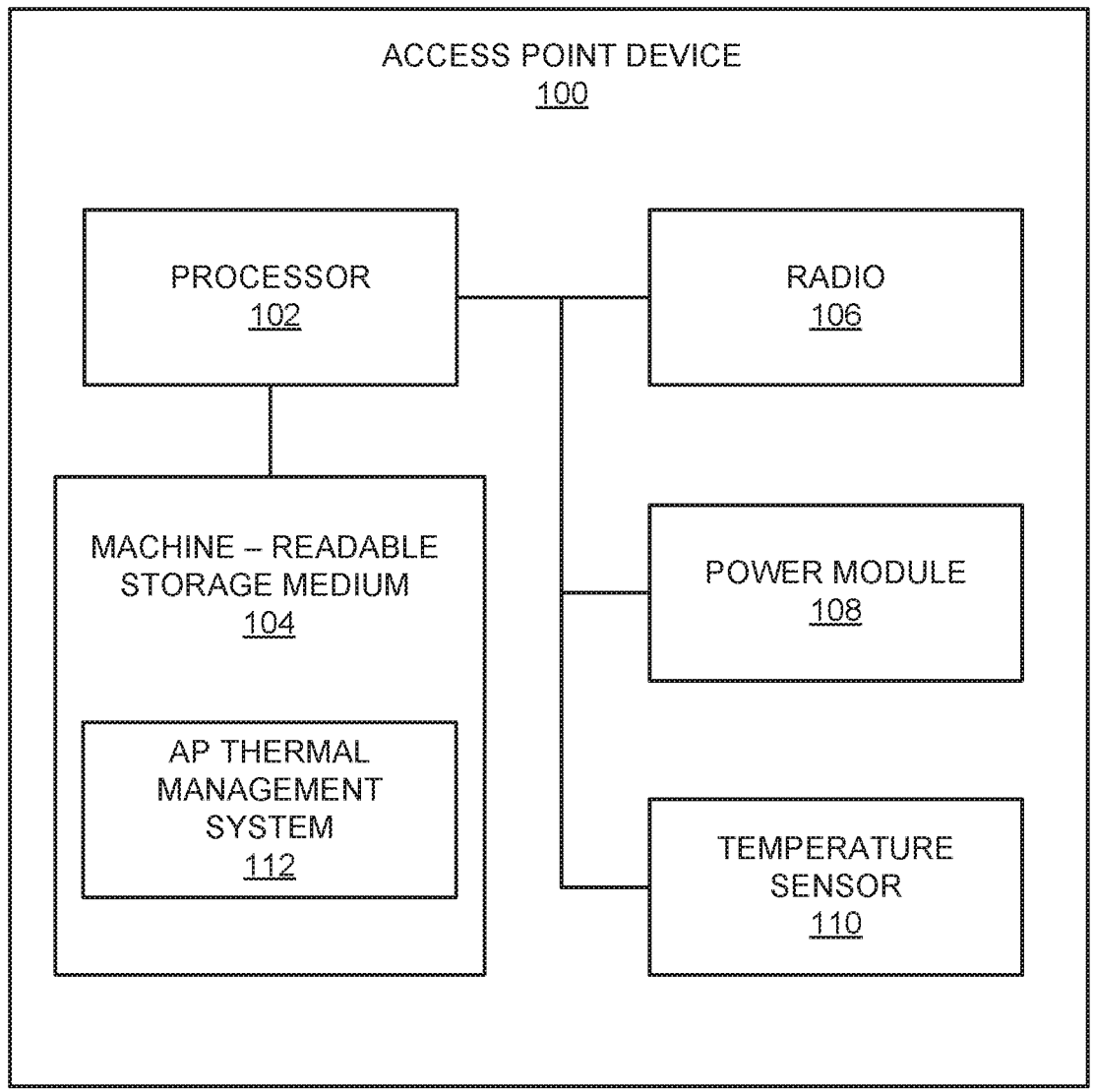
FIG. 1 is a block diagram representation of an example of an access point device including an example of an access point thermal management system.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Operating access point devices in a relatively high thermal operating environment may result in damage to one or more components of the access point device. Ambient temperature of an access point device may contribute to the thermal operating environment of the access point device. The ability to obtain a relatively accurate value of an ambient temperature of an access point device may be helpful in determining whether to implement one or more actions to thermally protect the access point device.

External temperature sensors disposed outside of access point devices may not provide accurate ambient temperature readings. In many cases, external temperature sensors placed outside access point devices may be susceptible to environmental damage. Estimating the ambient temperature of an access point device based on the power consumed by the access point device and an internal temperature of the access point device may be relatively more accurate than ambient temperatures obtained using an external temperature sensor.

Estimating the ambient temperature of an access point device may be based on both the internal temperature of the access point device and the power consumed by the access point device. The use of an assumption that the access point may be operating at a maximum power capacity may introduce an error in estimating the ambient temperature of the access point device. Estimating the ambient temperature of an access point device based on the actual power consumed by the access point device may be relatively more accurate than assuming that the access point device is operating at maximum capacity.

The use of the internal temperature of the access point device and the actual power consumed by the access point device may facilitate obtaining relatively accurate ambient temperatures for the access point device. An ambient temperature look up table that may define relationships between the actual power consumed by the access point device, the internal temperature of the access point device and the ambient temperature may be used to obtain relatively accurate estimates of the ambient temperature of the access point device.

More specifically, the actual power consumed by the access point device may be obtained from an intelligent power module (IPM) and the internal temperature of the access point device may be obtained from a temperature sensor disposed within the access point device. The ambient temperature look up table may be used to retrieve the ambient temperature associated with both the actual power consumed by the access point device and the internal temperature device of the access point device. The retrieved ambient temperature may be the estimated ambient temperature of the access point device.

In order to thermally protecting an access point device, the estimated ambient temperature may be compared to an ambient temperature threshold. If the estimated ambient temperature exceeds the ambient threshold, one or more components of the access point may be disabled to reduce the heat generated by the access point device. Reducing the heat generated by the access point device may reduce the temperature of the thermal operating environment of the access point device, thereby reducing the likelihood of heat related damage to one or more components of the access point device.

In an example, a method for thermally protecting an access point (AP) device includes receiving an actual AP power consumption value. The actual AP power consumption value is one of a plurality of potential AP power consumption values. The method further includes receiving a sensed internal AP temperature value. The sensed internal AP temperature value is one of a plurality of potential internal AP temperature values. The method also includes accessing an ambient temperature look up table that defines relationships between the plurality of potential AP power consumption values, the plurality of potential internal AP temperature values and a plurality of ambient temperature values. The method includes retrieving one of the plurality of ambient temperature values associated with the actual AP power consumption value and the sensed internal AP temperature value from the ambient temperature look up table. The retrieved ambient temperature value being an estimated ambient temperature value of the AP device.

In an example, a system for thermally protecting an access point (AP) device includes a computing device having a processor and a memory. An AP power consumption monitor stored in the memory. The AP power consumption monitor obtains an actual AP power consumption value. The actual AP power consumption value is one of a plurality of potential AP power consumption values. An internal AP temperature monitor is also stored in the memory. The internal AP temperature monitor obtains a sensed internal AP temperature value. The sensed internal AP temperature value is one of a plurality of potential internal AP temperature values. An ambient temperature look up table is stored in the memory. The ambient temperature look up table defines relationships between the plurality of potential AP power consumption values, the plurality of potential internal AP temperature values, and a plurality of ambient temperature values. An ambient temperature generator is also stored in the memory and operatively connected to the AP power consumption monitor, the internal AP temperature monitor, and the ambient temperature look up table. The ambient temperature generator retrieves one of the plurality of ambient temperature values associated with the actual AP power consumption value and the sensed internal AP temperature value from the ambient temperature look up table. The retrieved ambient temperature value is an estimated ambient temperature value of the AP device.

In an example, a non-transitory computer readable medium includes computer executable instructions stored thereon that, when executed by a processor in a source system, cause the processor to receive an actual access point (AP) power consumption value from an intelligent power module. the actual AP power consumption value is one of a plurality of potential AP power consumption values. The non-transitory computer readable medium further includes instructions to receive a sensed internal AP temperature value from a temperature sensor disposed within the AP device. The sensed internal AP temperature value is one of a plurality of potential internal AP temperature values. The non-transitory computer readable medium also includes instructions to access an ambient temperature look up table defining relationships between the plurality of potential AP power consumption values, the plurality of potential internal AP temperature values and a plurality of ambient temperature values. The non-transitory computer readable medium further includes instructions to retrieve one of the plurality of ambient temperature values associated with the actual AP power consumption value and the sensed internal AP temperature value from the ambient temperature look up table. The retrieved ambient temperature value being an estimated ambient temperature value of the AP device.

Referring to FIG. 1, a block diagram representation of an example of an access point (AP) device 100 is shown. The AP device 100 may include one or more processors (one shown) 102 that may be operatively connected to a machine-readable storage medium 104, one or more radios (one shown) 106, a power module 108, and a temperature sensor 110. In an example, the processor 102 may be a central processing unit (CPU) chip. In an example, the processor 102 may include one or more CPUs. Each of the one or more CPUs may be a single-core processor or a multi-core processor. In an example, the power module 108 is an intelligent power module (IPM) chip.

The machine-readable storage medium 104 may include both volatile and nonvolatile, removable and non-removable media, and may be any electronic, magnetic, optical, or other physical storage device that contains or stores executable instructions, data structures, program module, or other data accessible to the processor 102, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium 104 may be a non-transitory storage medium, where the term "non-transitory" does not encompass transitory propagating signals.

The radio(s) 106 may enable wireless communication with one or more client devices (not shown). The radio(s) 106 may be placed in an operation mode, an idle mode, and a disable mode. The radio(s) 106 may generate relatively less heat when placed in the idle mode or in the disable mode than when placed in the operating mode.

The power module 108 may manage the power supplied to the AP device 100. In an example, the power module 108 may be an intelligent power module (IPM). The temperature sensor 110 may be disposed within the AP device 100. In an example, the temperature sensor 110 may be a discrete temperature sensor 108 disposed within the AP device 100. In an example, the temperature sensor 110 may be integrated with the processor 102.

The machine-readable storage medium 104 may include an AP thermal management system 112. In an example, the AP thermal management system 112 may receive actual AP power consumption values from the power module 108 on a real time basis. In an example, the AP thermal management system 112 may receive actual AP power consumption values from the power module 108 on a periodic basis. In an example, the AP thermal management system 112 may receive sensed internal AP temperature values from the temperature sensor 110 on a real time basis. In an example, the AP thermal management system 112 may receive sensed internal AP temperature values from the temperature sensor 110 on a periodic basis.

The AP thermal management system 112 may include an ambient temperature look up table that defines relationships between a plurality of potential AP power consumption values, a plurality of potential internal AP temperature values, and a plurality of ambient temperature values. The thermal management system 112 may use the ambient temperature look up table to retrieve an ambient temperature value of the AP device 100 associated with the actual AP power consumption value by the AP device 100 and the sensed internal AP temperature value of the AP device 100. The retrieved ambient temperature value is the estimated ambient temperature value of the AP device 100.

The AP thermal management system 112 may compare the estimated ambient temperature value of the AP device 100 with an ambient temperature threshold. If the thermal management system 112 determines that the estimated ambient temperature value exceeds the ambient temperature threshold, the AP thermal management system 112 may implement one or more actions to thermally protect the AP device 100. In an example, the AP thermal management system 112 may disable at least one AP function to thermally protect the AP device 100. Examples of actions that may be implemented by the AP thermal management system 112 to thermally protect the AP device 100 include, but are not limited to, issuing an alarm to a management device (not shown), placing one or more radios 106 in an idle mode, and placing one or more radios 106 in a disable mode.

While a number of different components of an AP device 100 have been described, the AP device 100 may include additional components that facilitate the operation of the AP device 100.

Figure 2:
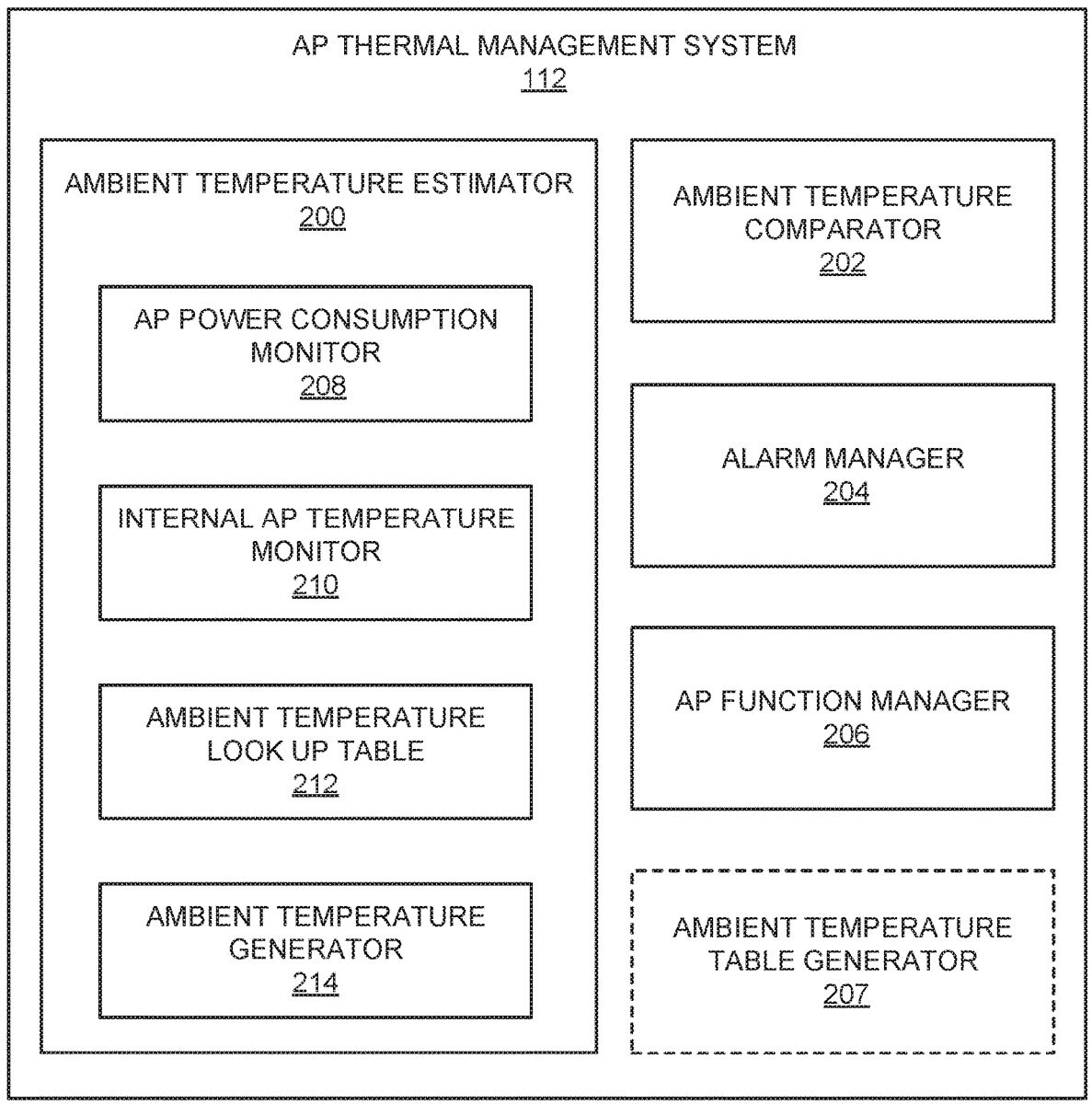
FIG. 2 is a block diagram representation of an example of an access point thermal management system.

Referring to FIG. 2, a block diagram representation of an example of an AP thermal management system 112 is shown. The AP thermal management system 112 may include an ambient temperature estimator 200, an ambient temperature comparator 202, an alarm manager 204, and an AP function manager 206. In an example, the AP thermal management system 112 may include an ambient temperature table generator 207.

The ambient temperature estimator 200 may include an AP power consumption monitor 208, an internal AP temperature monitor 210, an ambient temperature look up table 212, and an ambient temperature generator 214.

The AP power consumption monitor 208 may monitor the power consumption by the AP device 100. In an example, the AP power consumption monitor 208 may receive the actual AP power consumption values from the power module 108. The power module 108 manages the power supplied to the AP device 100. In an example, the AP power consumption monitor 208 may receive the actual AP power consumption values from the power module 108 on a real time basis. In an example, the AP power consumption monitor 208 may receive the actual AP power consumption values from the power module 108 on a periodic basis. In an embodiment, the power module 108 may be an intelligent power module (IPM).

The internal AP temperature monitor 210 may monitor the internal temperature of the AP device 100. In an example, the internal AP temperature monitor 210 may obtain the sensed internal AP temperature values from the temperature sensor 110. In an example, the internal AP temperature monitor 210 may obtain the sensed internal AP temperature values from the temperature sensor 110 on a real time basis. In an example, the internal AP temperature monitor 210 may obtain the sensed internal AP temperature values from the temperature sensor 110 on a periodic basis.

In an example, the temperature sensor 110 may be a discrete temperature sensor 110 disposed within the AP device 100. The temperature sensor 110 may sense the internal AP temperature within the AP device 100. The internal AP temperature sensed by the temperature sensor 110 may be the sensed internal AP temperature value received by the internal AP temperature monitor 210.

In an example, the temperature sensor 110 may be integrated with the processor 102. The temperature sensor 110 may sense the temperature of the processor 102. The temperature of the processor 102 sensed by the temperature sensor 110 may be the sensed internal AP temperature value received by the internal AP temperature monitor 210. In an example, the processor 102 is a CPU and the temperature sensor 110 is integrated with the CPU.

The ambient temperature look up table 212 may define relationships between the potential AP power consumption values, the potential internal AP temperature values, and the ambient temperature values. The ambient temperature table generator 207 may generate the ambient temperature look up table 212 by placing the AP device 100 under different operating conditions in a laboratory setting and recording the temperature dissipated by the AP device 100 under the different operating conditions.

In an example, the AP thermal management system 112 may include the ambient temperature table generator 207. In an example, the ambient temperature table generator 207 may be stored in a device external to the AP device 100. The external device may be operatively connected to the AP device 100 during the generation of the ambient temperature look up table 212 for the AP device 100. In an example, the ambient temperature look up table 212 may be generated for a specific type of AP device 100 in a laboratory setting. In an example, the ambient temperature look up table 212 may be generated for an AP device 100 by the manufacturer of the AP device 100 in a laboratory setting. In an example, the ambient temperature look up table 212 may be generated for a specific model of an AP device 100.

In an example, during the generation of the ambient temperature look up table 212, a plurality of potential AP power consumption power values may be supplied to the AP device 100. The internal AP temperature value of the AP device 100 may be varied for each of the different potential AP power consumption values in accordance with the potential internal AP temperature values.

The temperature dissipated by the AP device 100 under the different operating conditions may be measured. The temperature dissipated by the AP device 100 may be dissipation temperature values associated with each of the potential AP power consumption values and each of the potential internal AP temperature values for each of the potential AP power consumption values.

The estimated ambient temperature value associated with a specific potential AP power consumption value and an associated specific potential internal AP temperature value may be calculated by subtracting the temperature dissipated when the specific potential AP power consumption value is consumed by the AP device 100 at the specific potential internal AP temperature value.

The ambient temperature generator 214 may be operatively connected to the AP power monitor 208, the internal AP temperature monitor, and the ambient temperature look up table 212. The ambient temperature generator 214 may receive the actual AP power consumption value from the AP power consumption monitor 208 and receive the sensed internal AP temperature value from the internal AP temperature monitor 210. The ambient temperature generator 214 may access the ambient temperature look up table 212. The ambient temperature generator 214 may retrieve the ambient temperature value associated with the received actual AP power consumption value and the received sensed internal AP temperature value from the ambient temperature look up table 212. The retrieved ambient temperature value may be the estimated ambient temperature value of the AP device 100.

The ambient temperature comparator 202 may be operatively connected to the ambient temperature generator 214. The ambient temperature comparator 202 may receive the estimated ambient temperature value of the AP device 100 from the ambient temperature generator 214. The ambient temperature comparator 202 may compare the received estimated ambient temperature value with an ambient temperature threshold. The ambient temperature comparator 202 may determine whether the estimated ambient temperature value exceeds the ambient temperature threshold.

Operating AP devices 100 under relatively high thermal conditions may result in damage to one or more components of the AP device 100. Ambient temperature may contribute to the thermal operating conditions of the AP device 100. If the estimated ambient temperature value exceeds the ambient temperature threshold, the ambient temperature may contribute to thermal operating conditions that may result in damage to one or more components of the AP device 100.

In an example, the ambient temperature threshold may be an AP device specific threshold. In an example, the ambient temperature threshold may be specific to a type of AP device 100. In an example, the ambient temperature threshold may be specific to a model of the AP device 100. In an example, the ambient temperature threshold may be specific to a manufacturer of the AP device 100. In an example, the ambient temperature threshold may be defined in manufacturer provided specifications for the AP device 100.

The alarm manager 204 may be operatively connected to the ambient temperature comparator 202. If the ambient temperature comparator 202 determines that the estimated ambient temperature value for the AP device 100 exceeds the ambient temperature threshold, the alarm manager 204 may issue an alarm. In an example, the AP device 100 may be operatively connected to a management device (not shown). The alarm manager 204 may issue an alarm to the management device. An AP administrator may implement one or more actions to thermally protect the AP device 100 upon the issuance of an alarm at the management device.

The AP function manager 206 may be operatively connected to the ambient temperature comparator 202. If the ambient temperature comparator 202 determines that the estimated ambient temperature value for the AP device 100 exceeds the ambient temperature threshold, the AP function manager 206 may implement one or more actions to thermally protect the AP device 100. In an example, the AP function manager 206 may disable at least one AP function. In an example, the AP function manager 206 may place one or more radios 106 of the AP device 100 in an idle mode. In an example, the AP function manager 206 may place one or more radios 106 of the AP device 100 in a disable mode. Placing one or more radios 106 in idle mode or in disable mode may reduce the heat generated by the AP device 100. Reducing the heat generated by the AP device 100 may lower the likelihood of thermally damaging one or more components of the AP device 100. While a number of actions that may be taken to thermally protect the AP device 100 have been described, alternative actions that may reduce the heat generated by the AP device 100 may be implemented to thermally protect one or more components of the AP device 100 from heat related damage.

While one configuration of the AP thermal management system 112 has been described, alternative examples of the AP thermal management system 112 may have different configurations. In an example, the AP thermal management system 112 may include a subset of the described components. In an example, the AP thermal management system 112 may include other components in addition to those described.

Referring to FIG. 3, an example of an ambient temperature look up table 212 is shown. The ambient temperature look up table 212 may define relationships between potential AP power consumption values, potential internal AP temperature values, and estimated ambient temperature values. The ambient temperature look up table 212 may be created by placing the AP device 100 under different operating conditions in a laboratory setting and recording the temperature dissipated by the AP device 100 under the different operating conditions.

Different amounts of power may be supplied to the AP device 100, thereby varying the power consumed by the AP device 100. The power consumed by the AP device 100 may be referred to as the potential AP power consumption value. The first column 300 of the ambient temperature look up table 212 may list the potential AP power consumption values.

The internal AP temperature value of the AP device 100 may be varied for each of the different potential power consumption values defining the power consumed by the AP device 100. The internal AP temperature value may be referred to the potential internal AP temperature value. The second column 302 of the ambient temperature look up table 212 may list the potential internal AP temperature values for each of the potential AP power consumption values.

The temperature dissipated by the AP device 100 under the different operating conditions may be measured. The temperature dissipated by the AP device 100 may be referred to dissipation temperature values. The fourth column 304 of the ambient temperature look up table 212 may list the dissipation temperature values associated with each of the potential AP power consumption values and each of the potential internal AP temperature values for each of the potential AP power consumption values.

The estimated ambient temperature value associated with a specific potential AP power consumption value and an associated specific potential internal AP temperature value may be calculated by subtracting the temperature dissipated when power having the specific potential AP power consumption value is consumed by the AP device 100 from the specific potential internal AP temperature value. The third column 306 of the ambient temperature look up table 212 may list the estimated ambient temperature values.

In operation, ambient temperature generator 214 may receive the actual AP power consumption value from the AP power consumption monitor 208 and receive the sensed internal AP temperature value from the internal AP temperature monitor 210. An example of a received actual AP power consumption value may be 18 Watts. An example of a sensed internal AP temperature value may be 73° C. The ambient temperature generator 214 may access the ambient temperature look up table 212 to retrieve the estimated ambient temperature of 35° C. associated with the actual AP power consumption value of 18 Watts and the sensed AP internal temperature value of 73° C.

In an example, the ambient temperature look up table 212 may include the first column 300 including the potential AP power consumption values, the second column 302 including the potential internal AP temperature values, and the third column 306 including the estimated ambient temperature values. In an example, the fourth column 304 including the temperature dissipation values may only be used during the creation of the ambient temperature look up table 212.

Figure 4:
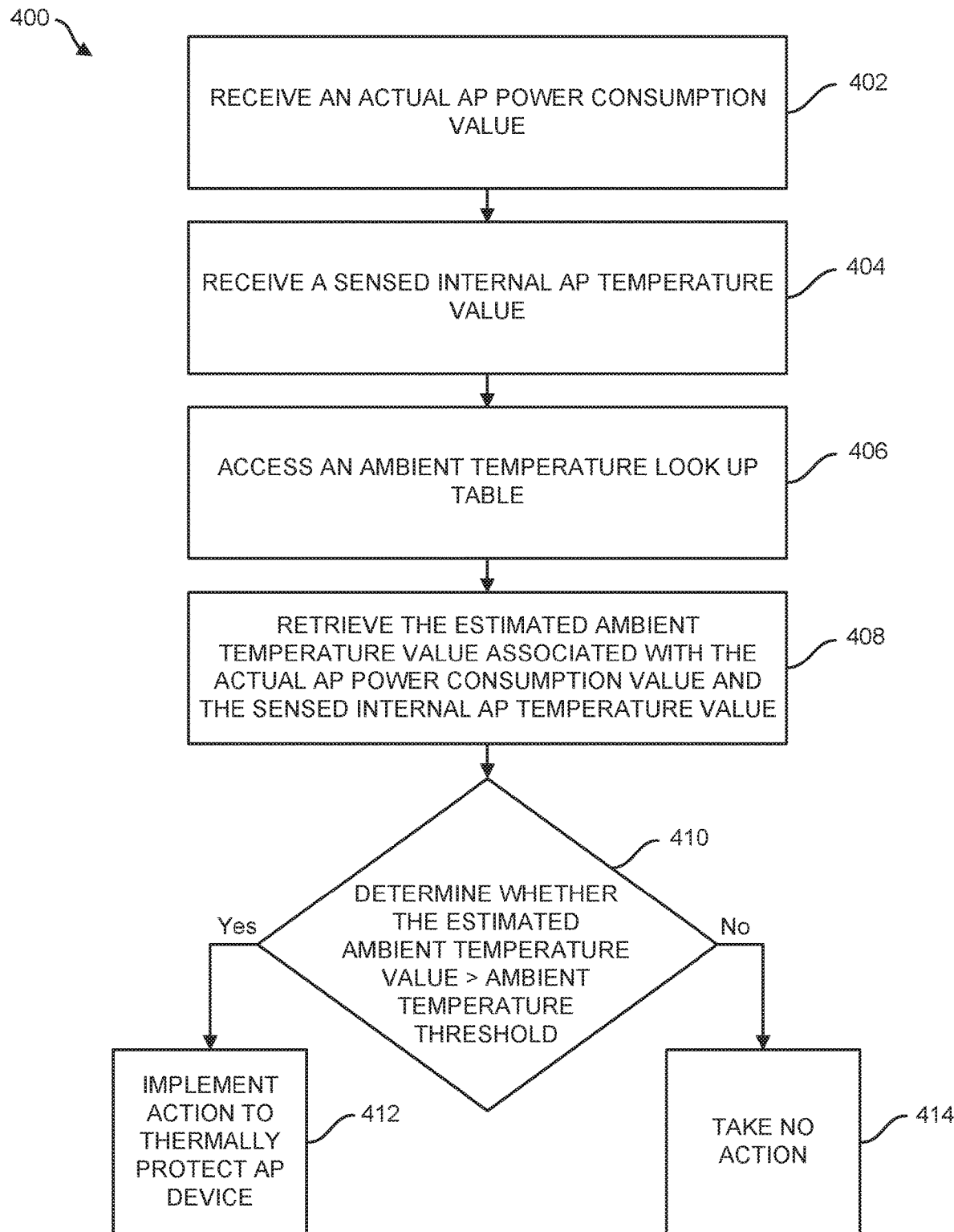
FIG. 4 is a flowchart depicting a method for thermally managing an access point device, according to one or more examples of the disclosure.

Referring to FIG. 4, a flowchart depicting a method 400 for thermally protecting an AP device 100 in accordance with one or more examples of the disclosure is shown. In operation, the method 400 may include receiving (block 402) an actual AP power consumption value. The actual AP power consumption value may be one of a plurality of potential AP power consumption values. In an example the actual AP power consumption value is received at the AP thermal management system 112. In an example, the actual AP power consumption value is received at the AP power consumption monitor 208 of the AP thermal management system 112. In an example, the actual AP power consumption value is received from the power module 108. In an example, the power module 108 is an intelligent power module (IPM).

In operation, the method 400 may include receiving (block 404) a sensed internal AP temperature value. The sensed internal AP temperature value may be one of a plurality of potential internal AP temperature values. In an example, the sensed internal AP temperature value is received at the AP thermal management system 112. In an example, the sensed internal AP temperature value is received at the internal AP temperature monitor 210 of the AP thermal management system 112. In an example, the sensed internal AP temperature value is received from the temperature sensor 110.

In an example, the temperature sensor 110 is a discrete temperature sensor disposed within the AP device 100. In an example, the temperature sensor 110 is integrated with the processor 102. In an example, the processor 102 is a CPU of the AP device 100. In operation, method 400 may include accessing (block 406) an ambient temperature look up table 212 defining relationships between the plurality of potential AP power consumption values, the plurality of potential internal AP temperature values and a plurality of ambient temperature values. In an example, the AP thermal management system 112 includes the ambient temperature look up table 212.

In operation, method 400 may include retrieving (block 408) one of the plurality of ambient temperature values associated with the actual AP power consumption value and the sensed internal AP temperature value from the ambient temperature look up table 212. The retrieved ambient temperature value may be an estimated ambient temperature value of the AP device 100. In an example, the AP thermal management system 112 may retrieve the one of the plurality of ambient temperature values associated with the actual AP power consumption value and the sensed internal AP temperature value from the ambient temperature look up table 212. In an example, the ambient temperature generator 214 at the AP thermal management system 112 may retrieve the one of the plurality of ambient temperature values associated with the actual AP power consumption value and the sensed internal AP temperature value from the ambient temperature look up table 212.

In operation, method 400 may include determining (block 410) whether the estimated ambient temperature value exceeds an ambient temperature threshold. In an example, the AP thermal management system 112 may determine whether the estimated ambient temperature value exceeds the ambient temperature threshold. In an example, the ambient temperature comparator 202 at the AP thermal management system 112 may determine whether the estimated ambient temperature value exceeds the ambient temperature threshold.

In operation, if the estimated ambient temperature value exceeds the ambient temperature threshold, the method 400 may include implementing (block 412) one or more actions to thermally protect the AP device 100. In an example, if the estimated ambient temperature value exceeds the ambient temperature threshold, an alarm may be issued to a management device. In an example, the alarm may be issued by the AP thermal management system 112. In an example, the alarm may be issued by the alarm manager 206 at the AP thermal management system 112.

In an example, if the estimated ambient temperature value exceeds the ambient temperature threshold at least one AP function at the AP device 100 may be disabled. In an example, the at least one AP function at the AP device 100 may be disabled by the AP thermal management system 112. In an example, the at least one AP function at the AP device 100 may be disabled by the AP function manager 206 at the AP thermal management system 112.

In an example, if the estimated ambient temperature value exceeds the ambient temperature threshold, one or more radios 106 at the AP device 100 may be placed in idle mode. In an example, one or more radios 106 at the AP device 100 may be placed in idle mode by the AP thermal management system 112. In an example, one or more radios 106 at the AP device 100 may be placed in idle mode by the AP function manager 206 at the AP thermal management system 112.

In an example, if the estimated ambient temperature value exceeds the ambient temperature threshold, one or more radios 106 at the AP device 100 may be placed in disable mode. In an example, one or more radios 106 at the AP device 100 may be placed in disable mode by the AP thermal management system 112. In an example, one or more radios 106 at the AP device 100 may be placed in disable mode by the AP function manager 206 at the AP thermal management system 112.

In operation, if the estimated ambient temperature value does not exceed the ambient temperature threshold, the method 400 may include taking (block 414) no further action.

Figure 5:
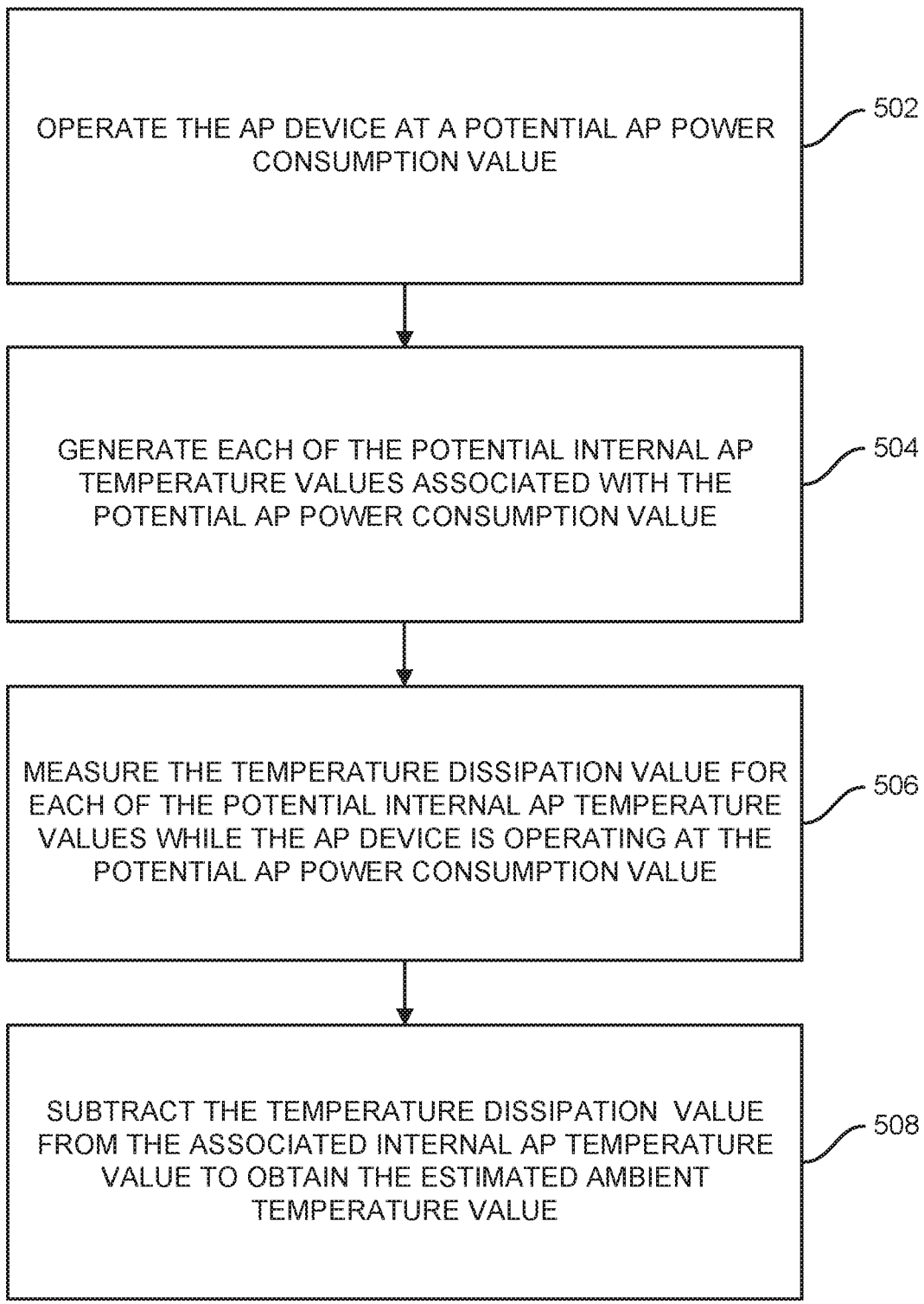
FIG. 5 is a flowchart depicting a method for generating an ambient temperature look up table, according to one or more examples of the disclosure.

Referring to FIG. 5, a flowchart depicting a method 500 for generating an ambient temperature look up table 212 in accordance with one or more examples of the disclosure is shown. In an example, the ambient temperature look up table 212 may be generated by the ambient temperature table generator 207. In operation, method 500 may include operating (block 502) the AP device 100 at a first one of the plurality of potential AP power consumption values. For example, referring to FIG. 3, the AP device 100 may be operated at a potential AP power consumption value of 18 Watts In operation, method 500 may be operating (block 504) at least one component of the AP device 100 to generate each of the plurality of potential internal AP temperature values associated with the first one of the plurality of potential AP power consumption values. For example, referring to FIG. 3, the processor 102 of the AP device 100 may be operated such that a temperature sensor 110 that is integrated with the processor 102 senses potential internal AP temperature values of 91° C., 73° C., and 55° C. while the potential AP power consumption value of 10 Watts is consumed by the AP device 100.

In operation, the method 500 may be measuring (block 506) a plurality of temperature dissipation values. Each of the plurality of temperature dissipation values may associated with placing the AP device 100 at each of the plurality of potential internal AP temperature values associated with the first one of the plurality of potential AP power consumption values. For example, referring to FIG. 3, when the potential AP power consumption value of 18 Watts may be supplied to the AP device 100 and the processor 102 may be operating at a level where a potential internal AP temperature value of 91° C. may be sensed by the temperature sensor 110, the temperature dissipation value measured may be 36° C.

In operation, the method 500 may be generating (block 508) a plurality of ambient temperature values. Each of the plurality of ambient temperature values may be based on a difference between each of the plurality of potential internal AP temperature values and the associated temperature dissipation value. For example, referring to FIG. 3, when the potential AP power consumption value of 18 Watts may be supplied to the AP device 100 and the processor 102 may be operating at a level where a potential internal AP temperature value of 91° C. may be sensed by the temperature sensor 110, the temperature dissipation value measured may be 36° C. The ambient temperature value may be obtained by subtracting the temperature dissipation value of 36° C. from the potential internal AP temperature value of 91° C. to obtain the ambient temperature value of 55° C.

The method 500 may be repeated for each of the plurality of potential AP power consumption values and each of the potential internal AP temperature values associated with each of the of potential AP power consumption values.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for thermally protecting an access point (AP) device, the method comprising:
   receiving an actual AP power consumption value, the actual AP power consumption value being one of a plurality of potential AP power consumption values;
   receiving a sensed internal AP temperature value, the sensed internal AP temperature value being one of a plurality of potential internal AP temperature values;
   accessing an ambient temperature look up table defining relationships between the plurality of potential AP power consumption values, the plurality of potential internal AP temperature values, and a plurality of ambient temperature values; and
   retrieving one of the plurality of ambient temperature values associated with the actual AP power consumption value and the sensed internal AP temperature value from the ambient temperature look up table, the retrieved ambient temperature value being an estimated ambient temperature value of the AP device.

2. The method of claim 1, further comprising:
   determining whether the estimated ambient temperature value exceeds an ambient temperature threshold; and
   issuing an alarm to a management device based upon the determination.

3. The method of claim 1, further comprising:
   determining whether the estimated ambient temperature value exceeds an ambient temperature threshold; and
   implementing one or more actions to thermally protect the AP device based upon the determination.

4. The method of claim 1, further comprising:
   determining whether the estimated ambient temperature value exceeds an ambient temperature threshold; and
   disabling at least one AP function based upon the determination.

5. The method of claim 4, wherein disabling at least one AP function comprises placing an AP radio in an idle mode or placing an AP radio in a disable mode.

6. The method of claim 1, wherein receiving the actual AP power consumption value comprises receiving the actual AP power consumption value from an intelligent power module (IPM).

7. The method of claim 1, wherein receiving the sensed internal AP temperature value comprises receiving the sensed internal AP temperature value from a temperature sensor integrated with a central processing unit (CPU) of the AP device.

8. The method of claim 1, wherein receiving the sensed internal AP temperature value comprises receiving the sensed internal AP temperature value from a discrete temperature sensor disposed with the AP device.

9. The method of claim 1, further comprising generating the ambient temperature look up table, generating the ambient temperature look up table comprising:
   operating the AP device at a first one of the plurality of potential AP power consumption values;
   operating at least one component of the AP device to generate each of the plurality of potential internal AP temperature values associated with the first one of the plurality of potential AP power consumption values;
   measuring a plurality of temperature dissipation values, each of the plurality of temperature dissipation values being associated with placing the AP device at each of the plurality of potential internal AP temperature values associated with the first one of the plurality of potential AP power consumption values; and
   generating a plurality of ambient temperature values, each of the plurality of ambient temperature values being based on a difference between each of the plurality of potential internal AP temperature values and the associated temperature dissipation value.

10. A system for thermally protecting an access point (AP) device, the system comprising:
    a computing device having a processor and a memory;
    an AP power consumption monitor stored in the memory, the AP power consumption monitor to obtain an actual AP power consumption value, the actual AP power consumption value being one of a plurality of potential AP power consumption values;
    an internal AP temperature monitor stored in the memory, the internal AP temperature monitor to obtain a sensed internal AP temperature value, the sensed internal AP temperature value being one of a plurality of potential internal AP temperature values;
    an ambient temperature look up table stored in the memory, the ambient temperature look up table defining relationships between the plurality of potential AP power consumption values, the plurality of potential internal AP temperature values, and a plurality of ambient temperature values; and
    an ambient temperature generator stored in the memory and operatively connected to the AP power consumption monitor, the internal AP temperature monitor, and the ambient temperature look up table, the ambient temperature generator to retrieve one of the plurality of ambient temperature values associated with the actual AP power consumption value and the sensed internal AP temperature value from the ambient temperature look up table, the retrieved ambient temperature value being an estimated ambient temperature value of the AP device.

11. The system of claim 10, further comprising:
    an ambient temperature comparator stored in the memory and operatively connected to the ambient temperature generator, the ambient temperature comparator to determine whether the estimated ambient temperature value exceeds an ambient temperature threshold; and an alarm manager stored in the memory and operatively connected to the ambient temperature comparator, the alarm manager to issue an alarm to a management device based upon the determination.

12. The system of claim 10, further comprising:

an ambient temperature comparator stored in the memory and operatively connected to the ambient temperature generator, the ambient temperature comparator to determine whether the estimated ambient temperature value exceeds an ambient temperature threshold; and an AP function manager stored in the memory and operatively connected to the ambient temperature comparator, the AP function manager to implement one or more actions to thermally protect the AP device based upon the determination.

13. The system of claim 10, further comprising:

an ambient temperature comparator stored in the memory and operatively connected to the ambient temperature generator, the ambient temperature comparator to determine whether the estimated ambient temperature value exceeds an ambient temperature threshold; and an AP function manager stored in the memory and operatively connected to the ambient temperature comparator, the AP function manager to disable at least one AP function based upon the determination.

14. The system of claim 10, further comprising:

an ambient temperature comparator stored in the memory and operatively connected to the ambient temperature generator, the ambient temperature comparator to determine whether the estimated ambient temperature value exceeds an ambient temperature threshold; and an AP function manager stored in the memory and operatively connected to the ambient temperature comparator, the AP function manager to place an AP radio in an idle mode based upon the determination.

15. The system of claim 10, further comprising:

an ambient temperature comparator stored in the memory and operatively connected to the ambient temperature generator, the ambient temperature comparator to determine whether the estimated ambient temperature value exceeds an ambient temperature threshold; and an AP function manager stored in the memory and operatively connected to the ambient temperature comparator, the AP function manager to place an AP radio in a disable mode based upon the determination.

16. The system of claim 10, further comprising an ambient temperature table generator stored in the memory and operatively connected to the ambient temperature look up table, the ambient temperature table generator to:

operate the AP device at a first one of the plurality of potential AP power consumption values;

operate at least one component of the AP device to generate each of the plurality of potential internal AP temperature values associated with the first one of the plurality of potential AP power consumption values;

receive a plurality of measured temperature dissipation values, each of the plurality of temperature dissipation values being associated with placing the AP device at each of the plurality of potential internal AP temperature values associated with the first one of the plurality of potential AP power consumption values; and generate a plurality of ambient temperature values, each of the plurality of ambient temperature values being based on a difference between each of the plurality of potential internal AP temperature values and the associated temperature dissipation value.

17. A non-transitory computer readable medium comprising computer executable instructions stored thereon that, when executed by a processor in a source system, cause the processor to:

receive an actual access point (AP) power consumption value from an intelligent power module, the actual AP power consumption value being one of a plurality of potential AP power consumption values;

receive a sensed internal AP temperature value from a temperature sensor disposed within the AP device, the sensed internal AP temperature value being one of a plurality of potential internal AP temperature values;

access an ambient temperature look up table defining relationships between the plurality of potential AP power consumption values, the plurality of potential internal AP temperature values, and a plurality of ambient temperature values; and retrieve one of the plurality of ambient temperature values associated with the actual AP power consumption value and the sensed internal AP temperature value from the ambient temperature look up table, the retrieved ambient temperature value being an estimated ambient temperature value of the AP device.

18. The non-transitory machine-readable storage medium of claim 17, further comprising instructions that when executed by the processor cause the processor to:

determine whether the estimated ambient temperature value exceeds an ambient temperature threshold, and issue an alarm to a management device based upon the determination.

19. The non-transitory machine-readable storage medium of claim 17, further comprising instructions that when executed by the processor cause the processor to:

determine whether the estimated ambient temperature value exceeds an ambient temperature threshold; and disable at least one AP function based upon the determination.

20. The non-transitory machine-readable storage medium of claim 17, further comprising instructions that when executed by the processor cause the processor to:

operate the AP device at a first one of the plurality of potential AP power consumption values;

operate at least one component of the AP device to generate each of the plurality of potential internal AP temperature values associated with the first one of the plurality of potential AP power consumption values;

receive a plurality of measured temperature dissipation values, each of the plurality of temperature dissipation values being associated with placing the AP device at each of the plurality of potential internal AP temperature values associated with the first one of the plurality of potential AP power consumption values; and generate a plurality of ambient temperature values, each of the plurality of ambient temperature values being based on a difference between each of the plurality of potential internal AP temperature values and the associated temperature dissipation value.

* * * * *